United States Patent [19]

Huggins et al.

[11] Patent Number: 4,950,566
[45] Date of Patent: Aug. 21, 1990

[54] METAL SILICIDE ELECTRODE IN LITHIUM CELLS

[76] Inventors: Robert A. Huggins, 824 San Francisco Ct., Stanford, Calif. 94305; Anaba A. Anani, P.O. Box 874, College Station, Tex. 77841

[21] Appl. No.: 261,512

[22] Filed: Oct. 24, 1988

[51] Int. Cl.$^5$ ............................................. H01M 4/40
[52] U.S. Cl. ................................... 429/218; 429/103
[58] Field of Search ................ 429/112, 194, 218, 103

[56] References Cited

U.S. PATENT DOCUMENTS

| | | | |
|---|---|---|---|
| 4,048,395 | 9/1977 | Lai ........................................ | 429/112 |
| 4,054,729 | 10/1977 | Isenberg ............................... | 429/112 |
| 4,076,905 | 2/1978 | Sammells ............................. | 429/218 |
| 4,340,652 | 7/1982 | Raistrick et al. .................... | 429/112 |
| 4,405,416 | 9/1983 | Raistrick et al. .................... | 204/68 |

OTHER PUBLICATIONS

Huggins, "Polyphase Alloys as Rechargeable Electrodes in Advanced Battery Systems", *Space Electrochemical Research and Technology*, NASA Conference Publication 2484, p. 1979 (1987); *Journal of Power Sources* 22, p. 341 (1988).

Huggins, "Materials Science Principles Relating to Alloys of Potential Use in Rechargeable Lithium Cells", paper to be published in *Journal of Power Sources*.

Anani et al., "Kinetic and Thermodynamics of Several Bindary Lithium Alloy Negative Electrode Materials at Ambient Temperature", *Journal of the Electrochemical Society* 134, No. 12, p. 3098, Dec. 1987.

*Primary Examiner*—Donald L. Walton
*Attorney, Agent, or Firm*—Majestic, Parsons, Siebert & Hsue

[57] ABSTRACT

The negative electrode of an electrochemical cell with lithium as the electroactive species includes a metal silicide. This metal silicide can be an alloy (that is, a multimetallic silicide) that reacts with lithium and acts as a reversible lithium reservoir during cell operation. Electrochemical cells in accordance with the invention have excellent kinetics and higher theoretical specific energy that the Li-Si binary alloys presently used in some thermal batteries. Magnesium silicide, calcium silicide and molybdenum silicide are particularly preferred materials for these negative electrodes due to their thermodynamic properties.

4 Claims, 1 Drawing Sheet

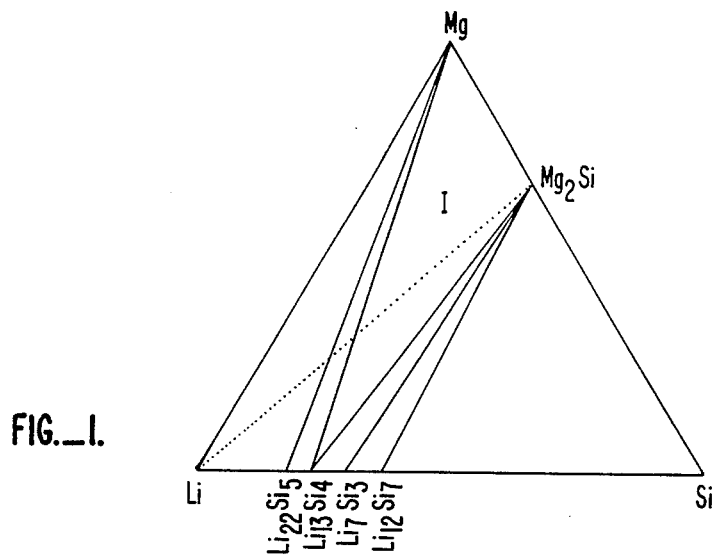
FIG._1.
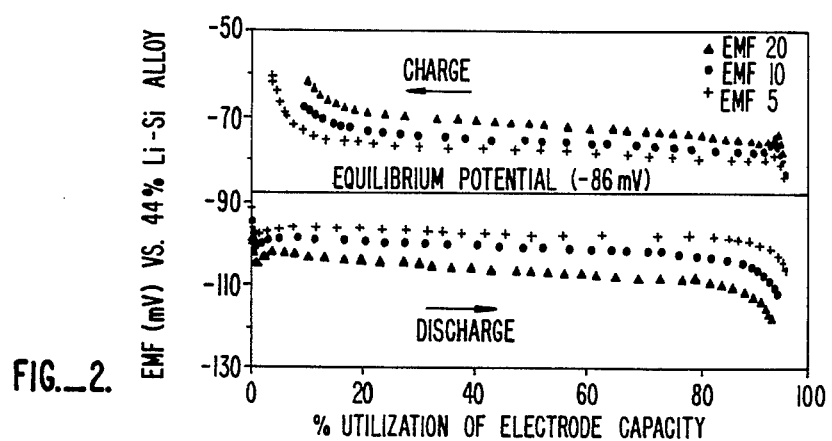
FIG._2.
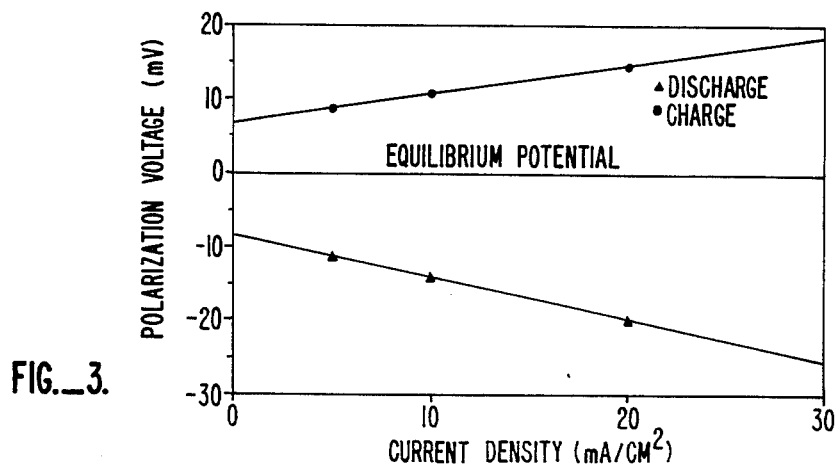
FIG._3.

METAL SILICIDE ELECTRODE IN LITHIUM CELLS

FIELD OF INVENTION

This invention relates generally to cells, such as electrochemical cells, in which lithium is the electroactive species, and more particularly to electrochemical cells having an improved negative electrode.

BACKGROUND OF THE INVENTION

There is a great deal of interest in better methods for energy storage. This is especially important for applications such as electric vehicles and the large scale storage of electric energy to level the load of stationary power plants.

Reversible lithium batteries with high energy (and power) density as well as high specific energy (and power) have been investigated for a number of uses, such as power sources for electric vehicles and energy storage devices However, problems associated with negative electrode materials often limit the cycling performance of such electrochemical cells, especially at lower temperatures.

When solid lithium in primary or secondary batteries is heated above its melting point, then the lithium can become liquid. This can lead to uncontrollable reactions and may result in safety concerns. Lithium alloys hold the potential of higher melting points and thus can reduce the potential for safety problems.

The use of elemental lithium as negative electrodes in batteries operated at elevated temperatures, where lithium is a liquid, presents serious problems, such as corrosion and difficulty in containment. Also, dissolution of lithium in a molten salt electrolyte can give rise to electronic conduction, which leads to severe self-discharge. On the other hand, when used at temperatures below its melting point, there can be the tendency for dendritic and filamentary growth of lithium upon recharging. This in turn may lead to electrical shorting between the electrodes and may also isolate the active electrode materials from electrochemical reaction, resulting in a loss of capacity.

Thus, one of the developments currently being pursued involves a lithium-based cell, in which the negative electrode is a lithium alloy (typically either lithium-aluminum or lithium-silicon).

Although the reversibility and cycle life of electrochemical cells can generally be increased by the use of such alloys, there is an accompanying reduction in the specific energy (and power) and energy (and power) density. These are a consequence of the reduced activity of the electroactive species in the negative electrode, which implies reduced cell voltage, as well as increased weight. There is also the problem of mechanical instability of the electrode structure as a result of volume and shape changes involved in the electrode reaction.

SUMMARY OF THE INVENTION

It is an object of the present invention to avoid the safety problems involved with pure lithium as negative electrode and to provide electrochemical cells that can be recharged, if desired, where lithium is the electroactive species.

In one aspect of the present invention, the negative electrode of an electrochemical cell with lithium as the electroactive species includes a metal silicide. This metal silicide reacts with lithium and acts as a reversible lithium reservoir during cell operation. Electrochemical cells, or batteries, in accordance with the invention have excellent kinetics and higher theoretical specific energy than the Li-Si binary alloys presently used in some thermal batteries, and are useful as primary batteries as well as secondary, or rechargeable batteries, for a wide variety of applications.

BRIEF DESCRIPTION OF THE DRAWINGS

In the drawings:

FIG. 1 is a calculated Li-Si-Mg ternary phase diagram at 700° K where the dotted line joining the $Mg_2Si$ phase to the lithium corner indicates a typical path for lithium addition or deletion;

FIG. 2 illustrates the discharge/charge cycles for the Li-Si-Mg system of the invention operated within the $Mg_2Si$-Mg-$Li_{13}Si_4$ tie triangle;

FIG. 3 illustrates polarization as a function of current density for the cell illustrated in FIG. 2.

DETAILED DESCRIPTION OF THE PREFERRED EMBODIMENT

The electrode potentials as well as their compositional capacities are important parameters if an electrochemical cell is to be useful as an energy storage device, while the power is related to the kinetics of electrode reactions.

Electrode reactions can generally be divided into two different types: insertion reactions, in which the composition of a solid solution changes; and, reconstitution reactions, in which the identity and amounts of the phases present can change. In an insertion reaction, the electroactive species enters, but does not change, the framework structure of the reactant; such reactions are thus often described as topotactic. The Gibbs phase rule requires that the chemical potential of the electroactive species, and thus the electric potential of the electrode reactant, varies with composition. The advantage of this type of reaction is that the electrode can be easily reversible if the chemical diffusion coefficient is high, since no phase change is involved. However, it has the disadvantage that the electrode potential is composition-dependent and there may be a limited compositional range for the electroactive species.

Reconstitutional reactions can involve the formation of a new phase. This may lead to a composition-independent value of the electric potential determined by the Gibbs free energies of formation of the phases present. If the number of phases present is equal to the number of components under constant temperature and pressure conditions, the Gibbs phase rule specifies that all intensive thermodynamic variables are fixed and independent of the overall composition. Chemical potentials, and thus electrode potentials under equilibrium conditions, are therefore independent of composition. The length of such a constant potential plateau is determined, in the case of a binary system, by the extent of the two-phase equilibrium, and, in a ternary case, by the extent of the three-phase equilibrium. The advantage of a reconstitution reaction is that it can lead to a constant equilibrium potential over a useful compositional range. Such reactions, however, have the disadvantage that their reversibility can be quite slow, since the relative amounts of the reactant and product phases change with the extent of reaction.

The performance of electrochemical cells employing lithium as the electroactive species can be improved by the use of ternary system alloys as the negative electrode. If information on a lithium-based binary system, Li-Si, is available, one can proceed to understand the behavior of a Li-Si based ternary system by the addition of a third component M. The addition of M to a binary alloy Li$_\alpha$Si can result in a significant change in either or both of the electrode potential and capacity, even when M does not itself react with lithium. First consider the case where M does not react with lithium. The reaction of lithium with Si to form the alloy Li$_\alpha$Si can be represented by the equation $$Si + \alpha Li \rightleftharpoons Li_{\alpha 0} Si \quad (1)$$

and the voltage is given by $$E_1 = -\Delta G_f(Li_\alpha Si)\alpha F \quad (2)$$

where $\alpha$ is the number of moles of lithium involved in the reaction, and F is Faraday's constant.

Small additions of M do not change the voltage of the electrode. However, on addition of sufficient M, the voltage of the electrode versus pure lithium changes such that $$E_2 = -\Delta G_r/\alpha F < E_1 \quad (3)$$

Where $\Delta G_r$ is the Gibbs free energy change of the reaction $$1/\beta Si_\beta M + \alpha Li \rightleftharpoons Li_\alpha Si + 1/\beta M \quad (4)$$

The consequence of the addition of M is then to make the electrode potential more negative, and thus to increase the voltage of any cell which uses M-Si as the negative electrode. However, one needs to minimize the amount of M added in order to take advantage of the reduced electrode potential without adding unnecessary weight.

Where M reacts with lithium, the potential of the electrode versus lithium is given by the reaction $$1/\beta Si_\beta M = (\alpha+\gamma/\beta) Li \rightleftharpoons Li_\alpha Si + 1/\beta Li_\gamma M \quad (5)$$

and
$$E_3 = -\Delta G_r/(\alpha+\gamma/\beta)F < E_1 \quad (6)$$

Again, the addition of M makes the electrode potential more negative and thus increases the cell voltage. The electrode capacity expressed in terms of the number of moles of lithium per mole of Si, also increases.

A ternary phase diagram which involves the binary system in question might increase both the cell voltage and storage capacity of the electrode. The consequence could be an increase in the specific energy or energy density if the third component is optimally maximized. In some cases, the existence of an Li-M phase may not be necessary if there exists a Li-Si-M ternary phase which gives rise to the same geometry in the lower part of the diagram The present invention provides negative electrodes for electrochemical cells with lithium as the electroactive species that are improved with respect to the lithium-based cell in which the negative electrode is a binary, lithium-silicon material. Electrochemical cells of the invention are improved by including a metal silicide negative electrode The metal silicide reacts with lithium and acts as a reversible lithium reservoir during cell operation This addition may involve either an insertion reaction or a reconstitution reaction. In some cases, there might be at least three phases in the negative electrode.

Light weight materials and those that form high density alloys with Si are desirable as the third component. In this way, one enhances either the specific energy or energy density.

The prior art Li-Si system is well characterized in terms of the alloy potential and lithium capacities. For example, in an equilibrium titration curve (EMF versus composition), there are four plateau regions, with potentials 332, 288, 158, and 44 mV positive of pure lithium. Of particular interest is the third plateau, which has a voltage of 158 mV versus lithium and a capacity of about 0.92 moles of lithium per mole of silicon. This converts to $1.81 * 10^{-2}$ moles of lithium per gram total weight.

The corresponding maximum theoretical specific energy (MTSE), when a material on this plateau is used as the negative electrode in a hypothetical cell with a 60 g/Li cathode which is 2.0 volts positive of pure lithium, is 428 watt hr/kg. This is comparable to a 44 wt.% Li-Si alloy and can be viewed as a baseline against which to compare the potentials and capacities of ternary systems of the invention.

The relevant information needed for the prediction of Li-Si-M ternary phase diagrams is the Gibbs free energy of all the phases, both binary and ternary, that are known to exist. Values for the Li-Si binary system have been calculated from the above-discussed titration curve. Ternary additions found suitable for negative electrodes of the invention include Ca, Mg, Mn, Mo, and V. These components all form alloys with Si, and thus are described as "metal silicides". Such metal silicides are either commercially available or can be readily prepared by heating finely divided metals in appropriate proportions. For example, magnesium silicide may be prepared by heating finely powdered Mg and Si in a proportion of 20 to 6. The magnesium silicide (Mg,Si), calcium silicide (CaSi) and molybdenum silicide (MoSi$_2$) are particularly preferred due to their thermodynamic properties. However, experiments with other metal silicides, such as NbSi$_2$ and CrSi$_2$, have indicated such to be also useful as the third component in the lithium-based cells.

Table 1 includes the electrode potentials, as well as capacities, for illustrative three-phase equilibria of negative electrodes in accordance with the invention. Also included in Table 1 are the values of maximum theoretical specific energy (MTSE) for the respective ternary reaction plateaus. They were obtained by using the equation $$MTSE = 26.805 * 10^3 * (Xe_{av.}/W) \quad (7)$$

where X is the number of moles of lithium transferred during the cell reaction, $E_{av.}$ is the difference between the positive and negative electrode potentials in volts, and W is the total weight in grams. For this purpose, a material with a capacity of 60 grams per lithium and a potential 2.0 volts positive of pure lithium was used as the reference positive electrode.

TABLE 1

| System | Starting Composition | Phases in Equilibrium | Electrode Potential (mV vs. Li) | Electrode Capacity Li/Si | Electrode Capacity Li/gram (×10³) | MTSE watt.hr/kg |
| --- | --- | --- | --- | --- | --- | --- |
| (prior art): | $Li_7Si_3$ | $Li_7Si_3$—$Li_{13}Si_4$ | 158 | 0.92 | 18.1 | 428 |
| | $Mg_2Si$ | $Mg_2Si$—Mg—$Li_{13}Si_4$ | 60 | 3.25 | 32.7 | 574 |
| | $Mn_3Si$ | $Mn_3Si$—Mn—$Li_{22}Si_5$ | 43 | 4.40 | 19.7 | 474 |
| | MoSi | $MoSi$—$Mo_5Si_3$—$Li_{13}Si_4$ | 120 | 2.275 | 24.8 | 502 |
| | $VSi_2$ | $VSi_2$—$V_5Si_3$—$Li_7Si_3$ | 191 | 1.63 | 25.2 | 486 |
| | CaSi | $CaSi$—$Ca_2Si$—$Li_{22}Si_5$ | 13 | 2.20 | 26.4 | 544 |

As may be seen by the data of Table I, the three systems (Li-Si-Mg, Li-Si-Ca, and Li-Si-Mo) are particularly preferred, based on their excellent thermodynamic properties and improved MTSE with respect to the prior art Li-Si binary system.

Positive electrodes for cells in accordance with the invention may be formed of a wide variety of materials. Substantially any materials that react with lithium and have a potential greater than the negative electrode may be used for the positive electrode. For example, suitable materials for the positive electrode include manganese, vanadium or molybdenum oxides, titanium, iron or molybdenum sulfides.

Suitable electrolytes for lithium-based cells in accordance with the invention will be selected with a view toward the temperature at which the cell is desired to operate. For example, at elevated temperatures (on the order of about 400° C.) the electrolyte must have high ionic conductivity for lithium, be stable at the elevated temperatures and in the environments imposed by the two electrodes, by the container and accessory apparatus (such as current collectors, seals and the like). Suitable electrolytes for such elevated temperature operation include halides such as LiX-KX eutectics (where X is a halide ion) Preferred electrolytes for the elevated temperature operation have a low electronic conductivity to reduce or eliminate problems with self-discharge. Electrolytes for intermediate temperature operations (such as an order of about 100°-120° C.) include alkali metal salt ammoniates, such as $LiClO_4 \cdot xNH_3$, and organometallic salts, such as $LiAlEt_4 \cdot$(where Et is ethyl). Suitable electrolytes for about room temperatures or below operation of electrochemical cells in accordance with the invention include $SO_2$ containing $LiAlCl_4$.

The metal silicide negative electrodes of the invention preferably are formed to be reasonably porous so that they have a large internal surface area, and they may include a binding agent, such as for example a tetrafluoroethylene polymer (for lower temperature operation) or elemental molybdenum, nickel or iron. Such binding agent may be in powdered form, admixed with a selected metal silicide powder, and the admixture pressed into the desired size and shape.

Aspects of the present invention will now be illustrated with reference to the particularly preferred negative electrode embodiment; however, the following is not intended to limit the scope of the invention as defined in the appended claims.

EXPERIMENTAL

The starting material for Li-Si-Mg system experiments, $Mg_2Si$(98%), was obtained from Morton Thiokol, Inc. (Alfa products). The LiCl-KCl eutectic used as electrolyte was from Lithium Corporation of America, while the 44% Li-Si alloy was from Sandia National Laboratory. Additional purification of the LiCl-KCl eutectic was required to remove any residual trace of water since this would react with lithium alloys. The purification process was by equilibration with Li, followed by introduction of Al to remove excess Li by formation of Li-Al alloy.

Electrode samples were made by cold pressing the appropriate powder into pellets.

The three electrode galvanic cell arrangement used in the experiments can be represented by (−) 44% Li-Si alloy/LiCl-KCl eutectic/$Li_xMg_2Si$ (+) with the 44% Li-Si alloy (e.g. Li at 44 wt.% and Si at 56 wt.% for a Li:Si ratio=3.18) as the reference electrode. The operating temperature was held at about 440 degrees centigrade. Both dynamic and equilibrium open circuit measurements were controlled using a potentiostat/galvanostat (PAR, model 173) coupled with a digital coulometer (PAR, model 179). Potentials were monitored through a digital multimeter (Keithley, model 172) and chart recorder arrangement. All experiments and materials preparations were carried out in a helium filled glove box.

FIG. 2 shows the performance of the electrode sample upon repeated cycles, in terms of the cell voltage versus capacity utilization at different current densities. Both the flatness of these discharge/charge curves and their relatively small sensitivity to current indicate fast kinetics in the sample electrode.

At the onset of a discharge or charge process, a small voltage spike is observed. This is normally associated with the nucleation of a new phase as the addition or removal of the electroactive specie moves the equilibria from one three-phase triangle in the ternary phase diagram to another. This voltage spike is readily avoidable if one prepares the starting material in such a way as to include a minute amount of the nucleated phase, and the discharge and charge cycles are terminated before reaching the ends of the three-phase equilibria. In this way, all three phases will always be present in the reactant sample.

The deviation of the dynamic cell voltage from both the predicted and measured equilibrium potential is shown in FIG. 3 as a function of the current density. The polarization is shown for a 50% state of utilization. These numbers, of the order of 0.40 and 0.57 mV/mA-$cm^{-2}$ of macroscopic surface area for the charge and discharge cycles respectively, are considered small at these current densities and temperature, and become only slightly larger near the end of the discharge and charge cycles.

The lithium-rich limit of the three phase equilibrium represented by the region marked "I" of FIG. 1 was determined by adding and deleting small amounts of charge to a sample of composition corresponding to the intersection of the dotted line joining the $Mg_2Si$ phase to the lithium corner and the $Li_{13}Si_4$-Mg tie-line. Two voltage plateau regions exist with voltages corresponding to the $Mg_2Si$-Mg-$Li_{13}Si_4$ and $Li_{13}Si_4Li_{22}Si_5$ equilibria. This in turn establishes the validity of the ternary phase diagram, FIG. 1, and thus confirms the capacity of the $Mg_2Si$-$Mg$-$Li_{13}Si_4$ three phase equilibrium as predicted from thermodynamic considerations, at 3.25 moles of lithium per mole of silicon (Li/Si).

The theoretical specific energy of cells using preferred materials can be about 35% higher than that for a comparable cell using the Li-Si binary alloy presently being used in thermal batteries. In addition, metal silicide negative electrodes of the invention show evidence of fast kinetics.

Thus, use of negative electrodes in accordance with the present invention can avoid the safety problems involved with pure lithium as negative electrode. When desired, the negative electrodes can be used in electrochemical cells that can be recharged. Alternatively, the inventive negative electrodes can be used in primary batteries.

Although the present invention has been described with reference to specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

It is claimed:

1. In an electrochemical cell with lithium as the electroactive species, the cell having a positive electrode, a negative electrode and an electrolyte, the improvement comprising:
the negative electrode including a metal silicide, the metal silicide reacting with lithium and acting as a reversible lithium reservoir during cell operation, the metal silicide including $Mg_2Si$ or $Mn_3Si$.

2. The cell as in claim 1 wherein the metal silicide is an alloy.

3. The cell as in claim 1 wherein the metal silicide includes $Mg_2Si$.

4. The cell as in claim 1 wherein the metal silicide includes $Mg_2Si$-$Mg$-$Li_{13}Si_4$ or $Mn_3Si$-$Mn$-$Li_{22}Si_5$.

* * * * *